July 14, 1942. A. P. PARKER 2,289,990
MANUFACTURE OF HOLLOW ARTICLES
Filed May 18, 1939
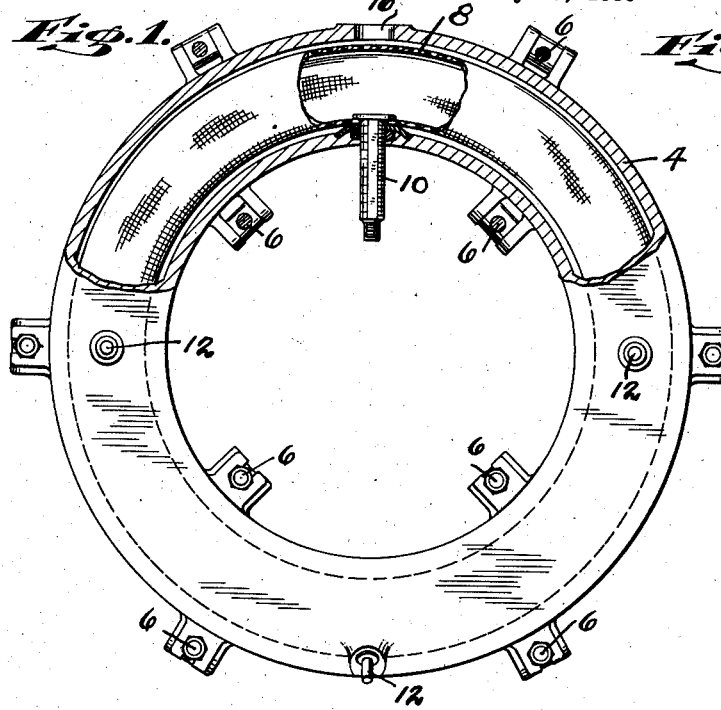
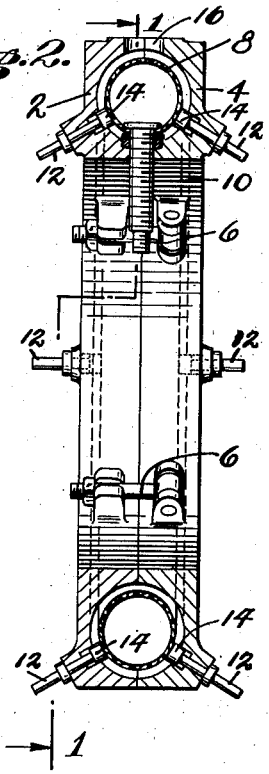
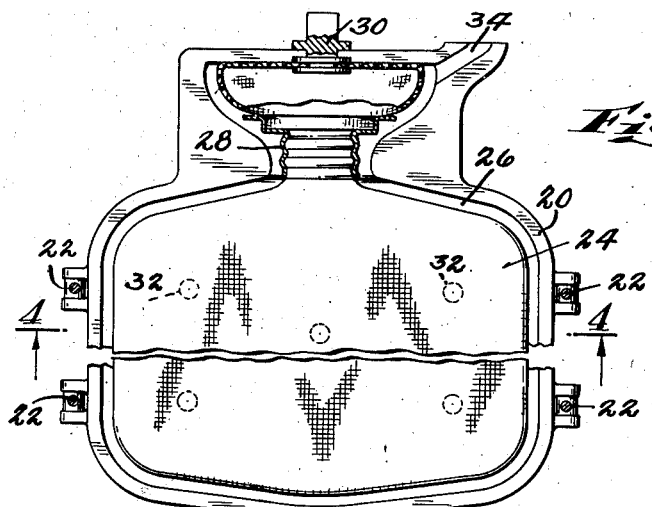
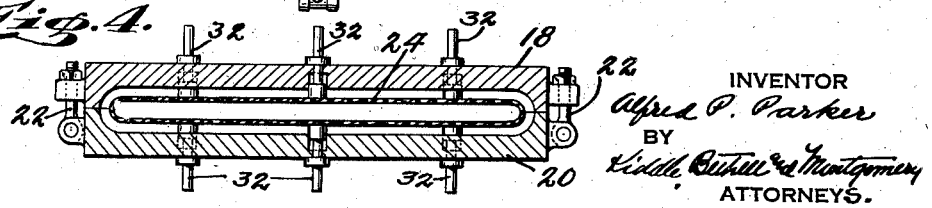
INVENTOR
Alfred P. Parker
BY
Liddle Bithell and Montgomery
ATTORNEYS.

Patented July 14, 1942

2,289,990

UNITED STATES PATENT OFFICE 2,289,990

MANUFACTURE OF HOLLOW ARTICLES

Alfred P. Parker, New York, N. Y.

Application May 18, 1939, Serial No. 274,333

2 Claims. (Cl. 18—56)

My invention relates to the manufacture of hollow articles, and has for one of its objects the provision of a process for the manufacture of such articles wherein a uniform wall thickness in the finished article is assured.

A further object of my invention is the provision of a method or process whereby seamless hollow articles may be produced in stationary molds.

My invention is adapted for the manufacture of hollow articles from various materials, and this is to be borne in mind, although for clarity I propose to describe my invention in connection with the use of latex, without, however, intending that the mention of this specific material is to be interpreted as a limitation.

The invention is adapted for the manufacture of so many kinds of hollow articles that it is impossible to mention them all, hence for purposes of description I will confine myself to tire tubes and water bottles, in that these are good examples of the two species of hollow articles, that is, the closed type—tire tubes—and the open type—water bottles.

The conventional way of making such articles heretofore has been by using masticated rubber or by a dipping process. My invention falls outside both of these methods, and is superior to them in that I avoid the necessity of seams—a line of weakness—and I am assured of uniform wall thickness which is difficult to control in the dipping process.

My process, as will be brought out hereinafter, is not necessarily confined to the making of hollow articles in which the walls are uniform in thickness but, on the contrary, in the practice of my invention the article may be of any desired shape and its walls may be varied in thickness at any areas desired. In other words, the wall may be thickened or thinned where thickness or thinness is desired.

Broadly speaking, my invention comprehends the use of a hollow mold containing a preformed and properly inflated core spaced from the walls of the mold, the space between the two to be filled with a suitable settable material, such as a latex. When making closed articles such as tire tubes, the core will be of such a nature that it can be left in the tube, but when the article is of the open type, such as a bottle, then the core can be withdrawn through the bottle neck.

In the accompanying drawing:

Fig. 1 is a view in part section, taken on the line 1—1 of Fig. 2, showing the use of my invention in the making of a tire tube;

Fig. 2 is a section through Fig. 1;

Fig. 3 is a sectional elevational view showing the use of my invention in the making of a bottle; and Fig. 4 is a section on the line 4—4 of Fig. 3.

Referring to the drawing in detail and first of all to Figs. 1 and 2: A suitable equipment for the practice of my invention may consist of a closed mold comprising the two sections 2 and 4 conveniently held to each other by clamps 6.

Within the mold is a core 8 to which the base of the stem 10 of the tube valve is attached, the stem communicating with the interior of the core. The core 8 is fabricated out of a suitable material such as silk which is flexible but not elastic. It may be treated, if necessary, with any suitable material so that it is airtight. This core, in the practice of my invention, is inflated either before or after it is placed in the mold, and it is so proportioned that when inflated its cross section at any point throughout the mold will be less than that of the mold. Accordingly a space is provided all around the mold between the core and the mold walls. This determines the wall thickness of the tube to be formed. The core 8 may be supported in central position within the mold in various ways. I have chosen to provide pins 12 at intervals around the mold and the inner ends 14 of these pins are adapted initially to project into the mold cavity into engagement with the core, as shown in the drawing.

The latex is poured into the mold through opening 16 and will fill the space between the core 8 and the mold cavity. Before this material has taken its final set or gell the pins 12 are retracted until the face of the inner end of each pin is flush with the mold wall.

As explained at the outset of this description, a wide variety of materials may be employed in the make-up of the tube. A suitable material may consist of:

| | | |
|---|---|---|
| The concentrated latex, known commercially as "Revertex" | grs | 1300 |
| Zinc carbonate | do | 150 |
| Sulphur | do | 30 |
| Zinc diethyl dithiocarbamate | do | 10 |
| Water | cc | 415 |

The mix is rendered unstable by the addition of 230 cc. of a 30% ammonium nitrate solution and the mixture poured into the mold. If quick setting is desired, the mold may be immersed in hot water. If cold setting is desired the setting agent should be increased, for example, by taking 380 cc. of a 71% ammonium nitrate solution.

It is to be understood that the above example of a suitable and usable material is merely given for illustrative purposes, inasmuch as there are many other materials which are equally good and may be used to as good or even better advantage.

After the molding material has set or gelled the mold is opened and the tube and core 8 removed, after which the tube may be vulcanized in any of the ways well known in the industry.

The core 8 remains in place, and in hollow articles which are not subjected to inflation will remain intact. In the case of a tire tube, however, inflation of the tube will cause the core to burst.

I might mention that where the mix employed in the making of the tube is such as to require heat for setting, I have found it advantageous to employ warm air for inflating the core 8 prior to the pouring of the molding mix.

The process so far described is particularly well adapted to the making of closed hollow articles wherein the core is not removed, but is left in place, intact, or as in the case of an inner tube, it is ruptured when the tube is inflated. In the making of hollow articles which are not closed the procedure is similar in principle, but in this instance the core is withdrawn.

Referring to Figs. 3 and 4 of the drawing wherein I have illustrated the making of a water bottle: In these figures the mold is made in two pieces, 18 and 20, held together by straps 22. A core 24 is placed in this mold. This core is not necessarily inflated but may be made of a starched fabric such as silk, for example, so as to be self-sustaining. The material is flexible. It is to be understood that this core is the shape of the inside of the bottle but of smaller cross section than the mold cavity to provide a space 26 about the exterior of the core. The neck of the core carries a threaded thimble 28 which is to be molded into the bottle neck. The top of the core is closed and carries a member 30 which may be employed to suspend the core in the mold. To insure that the core may be spaced properly from the mold cavity I provide pins 32 similar to the pins 12 of Fig. 1.

After everything is set up the molding material, which may be similar to that above referred to, is poured into the mold through the filler opening 34 and after the material has set, the mold is opened, and the bottle thus produced, with the core in place, is vulcanized. The core can then be withdrawn through the bottle neck by simply compressing the bottle a few times to dislodge the starch of the core so that the core will collapse and then pulling outwardly on the member 30.

It will be seen from all of the foregoing that I provide for the making of hollow articles of both the closed and open type, and, as above mentioned, it is to be understood that tire tubes and water bottles have been referred to merely by way of example.

It is to be understood also that changes may be made in the details of construction and arrangement of parts hereinabove described within the purview of my invention.

What I claim is:

1. The process of making hollow closed articles of rubber, which process comprises supporting an inflated hollow core of flexible substantially inelastic material within a mold cavity, and while maintaining the core out of contact with the walls of the mold filling the space thus provided between the core and mold walls with a settable rubber mix, and then inflating the article thus produced by building up pressure within the core until the core is ruptured.

2. The process of making hollow flexible articles, which process comprises enclosing a hollow non-metallic flexible but substantially inextensible core within a mold, while maintaining the core out of contact with the mold cavity filling the space thus provided with a settable latex, vulcanizing the article thus produced, and then inflating the article by inflating the core until the core is ruptured.

ALFRED P. PARKER.